(12) United States Patent
Mikat et al.

(10) Patent No.: US 11,225,882 B2
(45) Date of Patent: Jan. 18, 2022

(54) METHOD AND APPARATUS FOR DETERMINING A PRESENT VALUE BASED ON PREVIOUSLY OBTAINED VALUES OF A MEASURED VARIABLE OF A GAS TURBINE ENGINE AND/OR A THERMODYNAMIC PROCESS

(71) Applicant: Rolls-Royce Deutschland Ltd & Co KG, Blankenfelde-Mahlow (DE)

(72) Inventors: Heiko Mikat, Berlin (DE); Nikhil Reddy Podduturi, Berlin (DE); Juan Carlos Cabrejas, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 208 days.

(21) Appl. No.: 16/426,767

(22) Filed: May 30, 2019

(65) Prior Publication Data
US 2019/0376407 A1 Dec. 12, 2019

(30) Foreign Application Priority Data
Jun. 11, 2018 (DE) ...................... 10 2018 113 900.4

(51) Int. Cl.
*G01M 15/14* (2006.01)
*F01D 17/08* (2006.01)
(52) U.S. Cl.
CPC .............. *F01D 17/08* (2013.01); *G01M 15/14* (2013.01); *G05B 2219/37537* (2013.01)
(58) Field of Classification Search
CPC ................................................... G01M 15/14
See application file for complete search history.

(56) References Cited

U.S. PATENT DOCUMENTS

2007/0168157 A1 7/2007 Khibnik et al.
2008/0312756 A1 12/2008 Grichnik et al.
(Continued)

FOREIGN PATENT DOCUMENTS

EP 1790838 A1 5/2007
EP 2149824 A2 2/2010
(Continued)

OTHER PUBLICATIONS

Durvesn Pathak, Vishal P. Halale: An Introductory Approach to Virtual Sensors and Its Modelling Techniques. International Journal of Scientific & Engineering Research, vol. 7, Issue 3. Mar. 2016. ISSN 2229-5518. URL: https://www.researchgate.net/profile/Durvesh_Pathak/publication/314403412_An_Introductory_Approach_to_Virtual_Sensors_and_Its_Modell ing_Techniques/links/58c1a8b0a6f dcce648da9fcb/An-Introductory-Approach-to-Virtual-Sensors-and-Its-Modelling-Techniques.pdf.
(Continued)

*Primary Examiner* — Eric S. McCall
(74) *Attorney, Agent, or Firm* — Shuttleworth & Ingersoll, PLC; Timothy J. Klima (57) ABSTRACT

A method for determining a measured variable comprises the following steps: a) providing a data record comprising values of a plurality of input variables and values of the measured variable; b) ascertaining correlations between the values of the input variables and the values of the measured variable; c) creating a sensor model on the basis of the ascertained correlations; d) acquiring at least one further value of at least one of the input variables; and e) determining a value of the measured variable on the basis of the at least one further value of at least one of the input variables and the sensor model wherein the values of at least one of the input variables in steps a) and/or e) have been deter-
(Continued)

mined, in turn, according to steps a) to e). Further, a sensor system and a gas turbine engine are provided.

15 Claims, 5 Drawing Sheets

(56) References Cited

U.S. PATENT DOCUMENTS

| | | | |
|---|---|---|---|
| 2012/0323343 A1 | 12/2012 | Grichnik et al. | |
| 2019/0146000 A1* | 5/2019 | Hurst | G01P 5/14 702/144 |

FOREIGN PATENT DOCUMENTS

| | | | |
|---|---|---|---|
| EP | 2239441 | A2 | 10/2010 |
| EP | 2653944 | A2 | 10/2013 |

OTHER PUBLICATIONS

Kushagra Rastogi, Navreet Saini: Virtual Sensor Modelling using Neural Networks with Coefficient-based Adaptive Weights and Biases Search Algorithm for Diesel Engines. ArXiv:1712.08319. Dec. 2017. URL: https://arxiv.org/pdf/1712.08319 [abgerufen am Dec. 20, 2018].

Sanjay Garg, Klaus Schadow, Wolfgang Horn, Hugo Pfoertner, Ion Stiharu: Sensor and Actuator Needs for More Intelligent Gas Turbine Engines. ASME. Turbo Expo: Power for Land, Sea, and Air, vol. 3: Controls, Diagnostics and Instrumentation; Cycle Innovations; Marine. S. 155-167. Jul. 2010. doi:10.1115/GT2010-22685. URL: https://ntrs.nasa.gov/archive/nasa/c asi.ntrs.nasa.gov/20100029602.pdf [abgerufen am Dec. 20, 2018].

German Search Report dated Dec. 21, 2018 from counterpart German App No. 102018113900.4.

* cited by examiner

METHOD AND APPARATUS FOR DETERMINING A PRESENT VALUE BASED ON PREVIOUSLY OBTAINED VALUES OF A MEASURED VARIABLE OF A GAS TURBINE ENGINE AND/OR A THERMODYNAMIC PROCESS

This application claims priority to German Patent Application DE102018113900.4 filed Jun. 11, 2018, the entirety of which is incorporated by reference herein.

BACKGROUND OF THE INVENTION

The present disclosure relates to a method for determining a measured variable, a sensor system and a gas turbine engine according to the present disclosure.

In many situations, knowledge of a measured variable or a plurality of measured variables is necessary, particularly when operating machines, but a sensor for acquiring this measured variable is defective or not even available. In other situations, a redundant determination of the measured variable is necessary but only a single sensor of the measured variable is available. In such cases, a failed sensor can be repaired, replaced or added. The operation of machines may need to be interrupted to this end.

It is an object of the present invention to improve the determination of a measured variable.

SUMMARY AND DESCRIPTION OF THE INVENTION

According to one aspect, a method for determining a measured variable, in particular a measured variable in a gas turbine engine, is provided, said method comprising the following steps: A data record is provided in a step (a), said data record comprising values of a plurality of input variables and values of the measured variable to be determined. Correlations (in particular all correlations) between the provided values of the input variables and the values of the measured variable are ascertained in a step (b) that follows step a. A sensor model is created on the basis of the ascertained correlations in a step (c) that follows step b. At least one further value of at least one of the input variables is acquired in a further step (d), which is optionally carried out after step c. At least one value of the measured variable is determined on the basis of the at least one further value of the at least one of the input variables and the sensor model, for example, the plurality of input variables are provided to the sensor model which then outputs the measured variable, in a step (e) that follows step c and step d. The values of at least one input variable (or of a plurality of input variables, optionally of all the input variables) in steps a and/or e have been determined and/or acquired (and represent a measured variable), in turn, according to steps a to e. These values can be determined and/or acquired in this way in the method before being used in steps a and/or e.

The method facilitates the use of a virtual sensor as an input variable of a further virtual sensor. This renders it possible, by way of a virtual redundancy in comparison with an existing measurement position (i.e., by comparing the output of a virtual sensor with the output of an equivalent measurement position, e.g., of a hardware sensor), to check not only this other measurement position but also the input variables of the virtual sensor in respect of plausibility.

Moreover, a method for determining a measured variable is provided which is improved, in particular, to the effect that, after step d, a sensor for directly acquiring the measured variable (e.g., a temperature probe arranged at one position for acquiring the temperature at said position) is no longer required, wherein a particularly large number of measured variables can be determined using a restricted number of sensors. The value of the measured variable can be ascertained on the basis of the sensor model and on the basis of the further value or the further values of the one input variable (or the plurality of input variables). As a result of this, it is possible to compensate the failure of a sensor. Alternatively, it is possible to dispense with one or more sensors and, further, determine the measured variable. In this way, the structure of a sensor arrangement used in steps d and e, which provides the at least one further value of the at least one input variable, can be simplified. Further, it is possible to monitor a measured-variable-acquiring sensor.

Ascertaining the correlations in step b renders it possible to set up a precise sensor model in a simple manner, entirely without knowledge of the underlying physical relationships. By way of example, the variables measured at all available measurement positions, for example measured values of all sensors of a gas turbine engine, are included as input variables in step a. By way of the correlation analysis, it is possible to select those input variables that have a significant correlation with the measured variable. In this way, it is possible to react within a particularly short period of time to the failure of any sensor. The method can be applied, in particular, in the case of engines in which all variables to be measured and to be determined are correlated with one another. By way of example, all variables measured by means of sensors in a gas turbine engine can be correlated with one another, in particular all thermodynamic variables in the interior of the gas turbine engine.

The method provides a virtual sensor, in which the measured variable is ascertained by way of the input variables (that do not directly specify the measured variable).

Optionally, the values of the measured variable provided in step a are provided by a (physical) sensor that (directly) measures the measured variable, or they have been provided by such a sensor. The sensor is embodied and arranged to (directly) address the measured variable.

A subgroup of input variables of the plurality of input variables can be selected in step c. The subgroup comprises some of the input variables. Further, provision can be made for only the subgroup of input variables, but not the remaining input variables, to be used during the creation of the sensor model. By way of example, the subgroup is selected on the basis of the ascertained correlations. Thus, provision can be made for all input variables of the subgroup to be correlated with the measured variable, in particular correlated to at least a predetermined extent.

By way of example, the sensor model is ascertained by means of a self-learning algorithm. This renders it possible to determine precise values of the measured variable without knowledge of the underlying physical relationships. In particular, the sensor model is ascertained without application (optionally even without knowledge) of a physical model that links the values of the input variable(s) to the values of the measured variable. Typically, ascertaining an actual physical model of the sensor model is particularly time-consuming. In comparison therewith, a self-learning algorithm can be applied particularly quickly. The self-learning algorithm comprises an artificial neural network, for example. By way of example, the artificial neural network can be trained using a supervised learning method. As an alternative or in addition thereto, an evolutionary algorithm, in particular genetic programming, is used to ascertain the sensor model. What was found here is that particularly precise results are obtainable if more operators than input variables are used, e.g., two or three operators more than input variables. Optionally, the number of iterations is predetermined as a termination criterion in this case, for example for a quick ascertainment of the sensor model. Particularly in the case of a measured variable to be determined particularly precisely, the quality of the value of the measured variable determined by means of the sensor model can be used as a termination criterion. By way of example, a criterion may be that the deviation of the determined value of the measured variable from a reference value (e.g., a value measured by means of a physical sensor) drops below a predetermined threshold. As an alternative or in addition thereto, the sensor model can be ascertained using a genetic algorithm. Further, it is possible to carry out at least one regression analysis for the purposes of ascertaining the sensor model. Optionally (particularly in the context of one of the aforementioned methods), a moving average, for example of one or more input variables and/or of the measured variable, is formed when ascertaining the sensor model.

The sensor model may comprise a correlation matrix. As an alternative or in addition thereto, the sensor model is ascertained by means of a correlation matrix. By way of example, the strongest correlations are ascertained by means of the correlation matrix and the sensor model is based on these correlations.

Optionally, the at least one input variable and the measured variable are variables of a gas turbine engine and/or thermodynamic variables. By way of example, a sensor, which acquires the measured variable, of the gas turbine engine can be controlled. Additionally, it is possible to continue to determine the measured variable should the sensor of the measured variable fail. By way of example, values of the measured variable can continue to be determined should the sensor of the measured variable fail during a flight of an aircraft having such a gas turbine engine. Further, it is possible to determine measured variables for which no sensor is employable, e.g., for structural reasons, during the operation of the gas turbine engine (e.g., during a flight).

By way of example, the at least one input variable specifies a pressure, a temperature and/or a volume flow rate.

The measured variable can specify a pressure, a temperature, a volume flow rate or a manipulated variable of an adjustable component, in particular of a valve.

The values of the input variables provided in step a may comprise values measured by at least one sensor and/or simulated values. By way of example, these values of the input variables are ascertained in one or more reference measurements, in particular together with values of the measured variable.

According to one aspect, a sensor system for determining a measured variable is provided, said sensor system being embodied and configured to carry out the method according to any one of the refinements described herein.

According to one aspect, a sensor system for determining a measured variable is provided, said sensor system comprising a plurality of virtual sensors connected to one another in cascade-type fashion, for example. Here an output of a virtual sensor can be connected to an input of a further virtual sensor.

According to one aspect, a sensor system for determining a measured variable is provided. The sensor system comprises a correlation module embodied to obtain a data record comprising values of a plurality of input variables and values of the measured variable, ascertain correlations between the values of the input variables and the values of the measured variable, and ascertain a sensor model or a plurality of sensor models on the basis of the ascertained correlations; and an analysis module configured to receive the sensor model or sensor models from the correlation module, wherein the analysis module has at least one input and one output and is embodied, upon provision of at least one further value of at least one of the input variables at the analysis module, in particular at the at least one input, to determine a value of the measured variable on the basis of the at least one further value of at least one of the input variables and the sensor model or sensor models and to output said value at the output. The sensor system is embodied in such a way that one or more values of the measured variable determined by the analysis module is/are used as a value/values of an input variable by the analysis module and/or is/are provided by the analysis module (e.g., as part of the data set) to the correlation module. The sensor system can be embodied and configured to carry out the method according to any one of the refinements described herein.

In this way, a sensor system for determining a measured variable is provided, said sensor system being improved to the extent that, in particular, a sensor is not mandatory for acquiring the measured variable. The sensor system, specifically the analysis module, provides a virtual sensor.

Optionally, the correlation module comprises a memory device, on which the data record is stored.

Further, the sensor system may comprise at least one sensor embodied and configured to measure values of an input variable and provide said values to the at least one input of the analysis module.

By way of example, the sensor is a pressure sensor, a temperature probe or a volume flow rate measuring device.

According to one aspect, a gas turbine engine is provided, in particular a gas turbine engine for an aircraft. The gas turbine engine comprises a plurality of virtual sensors, wherein an output of a virtual sensor is connected to an input of a further virtual sensor. Optionally, the gas turbine engine comprises a sensor system according to any refinement described herein, said refinement, in particular, being able to provide one or more virtual sensors. Each virtual sensor can process a plurality of different input variables and determine a measured variable.

The skilled person will appreciate that except where mutually exclusive, a feature or parameter described in relation to any one of the above aspects may be applied to any other aspect. Furthermore, except where mutually exclusive, any feature or any parameter described herein may be applied to any aspect and/or combined with any other feature or parameter described herein.

BRIEF DESCRIPTION OF THE FIGURES

Embodiments will now be described by way of example, with reference to the figures, in which.

DETAILED DESCRIPTION

Figure 1:
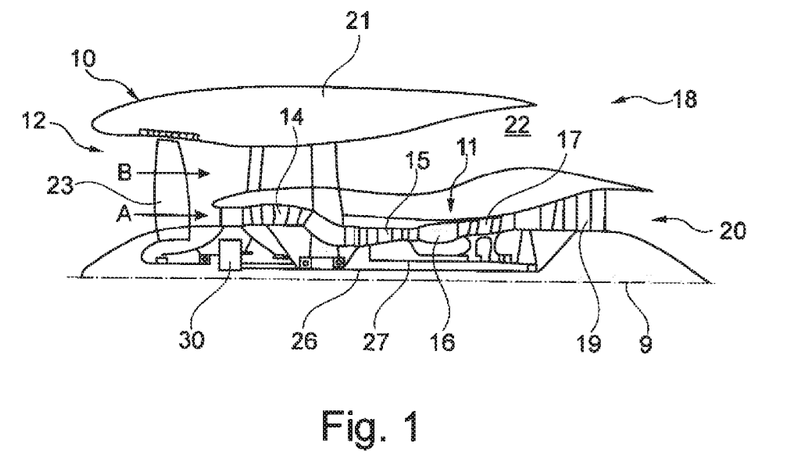
FIG. 1 shows a sectional side view of a gas turbine engine.

FIG. 1 illustrates a gas turbine engine 10 having a principal rotational axis 9. The gas turbine engine 10 comprises an air intake 12 and a fan 23 that generates two airflows: a core airflow A and a bypass airflow B. The gas turbine engine 10 comprises a core 11 that receives the core airflow A. When viewed in the order corresponding to the axial direction of flow, the core engine 11 comprises a low pressure compressor 14, a high pressure compressor 15, a combustion device 16, a high pressure turbine 17, a low pressure turbine 19 and a core thrust nozzle 20. A nacelle 21 surrounds the gas turbine engine 10 and defines a bypass duct 22 and a bypass thrust nozzle 18. The bypass airflow B flows through the bypass duct 22. The fan 23 is attached to and driven by the low pressure turbine 19 via a shaft 26 and an epicyclic planetary gearbox 30.

In operation, the core airflow A is accelerated and compressed by the low pressure compressor 14 and directed into the high pressure compressor 15 where further compression takes place. The compressed air exhausted from the high pressure compressor 15 is directed into the combustion device 16, where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic planetary gearbox 30 is a reduction gearbox.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is/are defined by a conventional axis system, comprising an axial direction (which is aligned with the rotational axis 9), a radial direction (in the bottom-to-top direction in FIG. 1), and a circumferential direction (perpendicular to the view in FIG. 1). The axial, radial and circumferential directions are mutually perpendicular.

Figure 2:
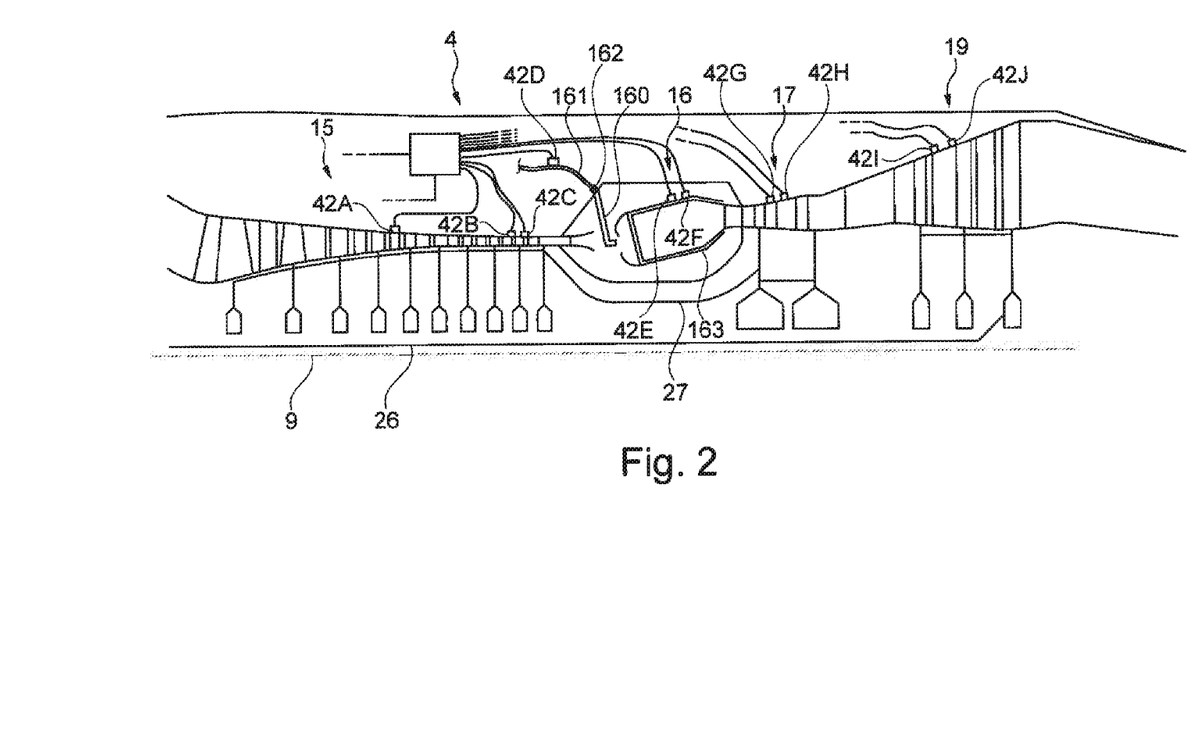
FIG. 2 shows a magnified sectional side view of a portion of the gas turbine engine with a sensor system.

FIG. 2 shows further details of the gas turbine engine 10. The gas turbine engine 10 comprises a sensor system 4. The sensor system 4 comprises a plurality of physical (hardware) sensors 42A-42J, which are arranged at a plurality of positions in the gas turbine engine 10. In the shown example, sensors 42A-42J are in each case assembled on the high pressure compressor 15, on a fuel line 161, on a combustion chamber 163 of the combustion device 16, on the high pressure turbine 17 and on the low pressure turbine 19. These sensors 42A-42J are connected to an analysis module 41 via signal lines. Further sensors, not shown in FIG. 2, may be connected to the analysis module 41.

A sensor 42A for measuring the volume flow rate of the air through-flow, a sensor 42B for measuring the temperature of the air through-flow and the sensor 42C for measuring the pressure of the air through-flow are arranged on the high pressure compressor 15.

The combustion device 16 comprises a fuel injection 160, by means of which the fuel provided by way of the fuel line 161 is injected into the combustion chamber 163. The amount of injected fuel is regulable by means of an adjustable valve. A sensor 42D for measuring the volume flow rate of the fuel through-flow is arranged on the fuel line 161. A sensor 42E for measuring the temperature and a sensor 42F for measuring the pressure in the combustion chamber 163 are arranged on the combustion chamber 163.

A sensor 42G, 42I for measuring the temperature of the air through-flow and a sensor 42H, 42J for measuring the pressure of the air through-flow are respectively arranged on the high pressure turbine 17 and the low pressure turbine 19.

It should be noted that the gas turbine engine 10 need not necessarily comprise all of the aforementioned sensors 42A-42J.

The analysis module 41 is embodied to receive signals from the sensors 42A-42J.

The sensor system 4 provides one or more virtual sensors. Optionally, the sensor system 4 provides a corresponding virtual sensor for each of the sensors 42A-42J. If one of the sensors 42A-42J fails during the operation of the gas turbine engine 10, e.g., the sensor 42G for measuring the temperature in the high pressure turbine 17, the measured values of this sensor can be replaced by values for the same measured variable, which are determined with the aid of the virtual sensor. As an alternative or in addition thereto, values of the measured variable (e.g., the temperature in the high pressure compressor) can be ascertained at all times, which then, for the purposes of validating the measured values of the sensor 42G of the same measured variable, can be compared with these measured values. A defect of the sensor 42G can be deduced if there is a deviation between the values of the measured variable ascertained (in virtual fashion) by the sensor system 4 and the values of the measured variable ascertained by means of the (physical) sensor 42G.

Should a defect of a sensor be identified, a virtual sensor for the measured variable thereof is optionally created automatically as a reaction thereto.

Figure 3:
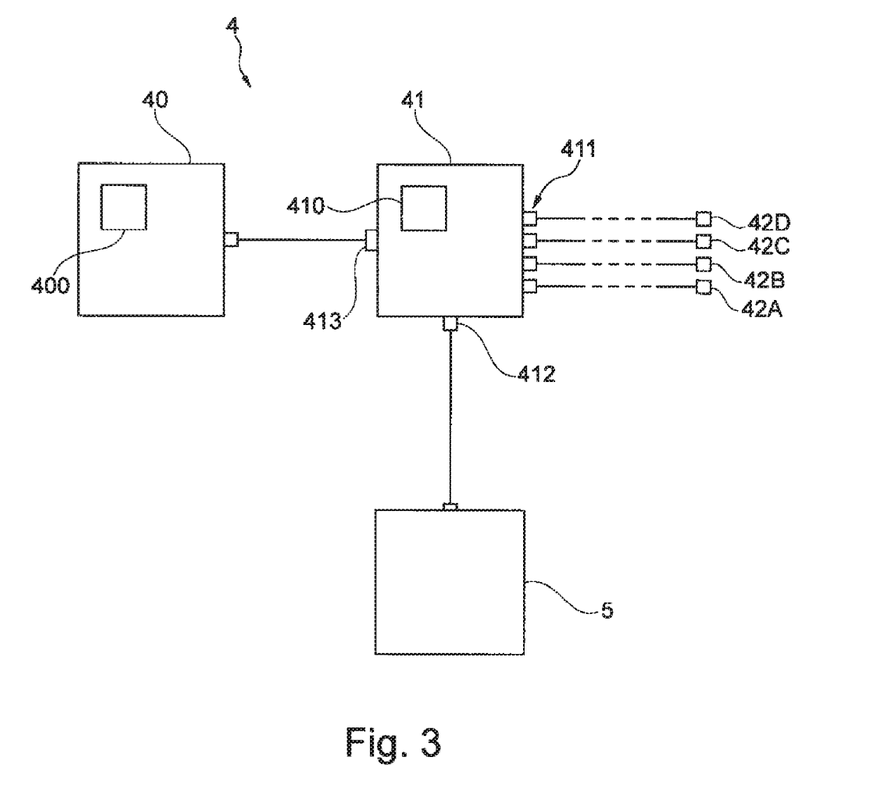
FIG. 3 shows a schematic view of the sensor system of the gas turbine engine.

FIG. 3 shows the sensor system 4 of the gas turbine engine 10, wherein not all sensors 42A-42J have been depicted for reasons of simplicity.

The analysis module 41 is embodied as a data processing device, for example, or it comprises such a data processing device. The analysis module 41 comprises a memory device 410 for storing computer readable data. The sensor model is stored in the memory device 410 or a plurality of sensor models are stored therein. The analysis module 41 comprises a plurality of inputs 411, with a sensor 42A-42J being connected to each input 411. At the respectively connected inputs 411, the sensors 42A-42J provide values of input variables that are indicative for the variable to be measured by the respective sensor 42A-42J. The analysis module 41 calculates a value of the measured variable by means of the sensor model and on the basis of the values of the input variables. The analysis module 41 outputs this value of the measured variable at an output 412 and/or uses it as a further input variable for the sensor model or another sensor model of the analysis module 41, wherein, in that case, the output variable thereof can be output at the output 412. Optionally, one or more of the inputs 42A-42D are connected to the output 412 or to the output 412 of a further sensor system 4. The sensor system 4 can comprise or provide a plurality of virtual sensors that are coupled (e.g., communicatively) to one another.

By way of example, a display device 5, which displays the value of the measured variable, is connected to the output 412.

The sensor model is based on values of the input variables and the measured variable, wherein these values of the measured variable have been acquired by means of a physical sensor. The sensor system 4 comprises a correlation module 40 for the purposes of creating the sensor model.

The correlation module 40 comprises a memory device 400, stored on which there is a data record that comprises values of the input variables (e.g., values of some or all of the sensors 42A-42J of the gas turbine engine 10). Further, the data record comprises values of the measured variable, which have been acquired by means of a physical sensor, for example by means of the sensor 42G for measuring the temperature in the high pressure turbine 17. The correlation module 40 is embodied to ascertain correlations between the values of the input variables and the values of the measured variable on the basis of the stored data record. A subgroup of the input variables that are particularly strongly correlated with the measured variable is selected on the basis of the ascertained correlations. This sorts out the weakly correlated input variables, which may improve the quality of the sensor model to be created. Sensor model is created on the basis of the ascertained correlations. Here, the correlation module 40 applies machine learning. In the shown example, the correlation module 40 comprises genetic programming. Here, the sensor module is optimized according to an evolutionary approach over a plurality of iterations.

The correlation module 40 provides the sensor model to the analysis module 41. To this end, the analysis module 41 comprises an input 413, by means of which the correlation module 40 is connected or connectable to the analysis module 41.

The correlation module 40 is embodied as a data processing device, for example, or it comprises such a data processing device. The correlation module 40 and the analysis module 41 are spatially separated from one another in the example according to FIG. 3. The analysis module 41 is arranged on the gas turbine engine 10 (or alternatively on an aircraft with the gas turbine engine 10). The correlation module 40 is optionally, but not necessarily, arranged on the gas turbine engine 10 (or aircraft).

Should the correlation module 40 be arranged on the gas turbine engine 10, it can receive continuously measured values from one, more or all of the sensors 42A-42J (e.g., via connections, not illustrated, to the sensors 42A-42J or by way of the analysis module 41). Using these measured values (which may specify the input variables and/or the measured variable), the correlation module 40 is able to re-create and/or optimize the sensor model, and provide it to the analysis module 41, continuously or at discrete time intervals. This allows a sensor drift, for example, to be compensated.

As an alternative, it is possible for the correlation module 40, after receiving the data record, creating the sensor model and providing the sensor model to the analysis module 41 (via the connection shown in FIG. 3 or, alternatively, in a wireless fashion, via a data network or a data medium), to be spaced apart (and/or communicatively separated) from the analysis module 41.

Hence, it is possible for, e.g., test measurements to be carried out on the gas turbine engine 10 (or a structurally equivalent or comparable gas turbine engine), in which a physical sensor is provided for the measured variable. These test measurements supply the data record for creating (and optionally for validating) the sensor model. Then, during the operation of the gas turbine engine 10, the measured variable can be determined by means of the analysis module 41 (which provides a virtual sensor), without the physical sensor being necessary. As a result of this, one or more sensors can be dispensed with during the operation of the gas turbine engine 10, which may reduce the weight and improve the reliability. Moreover, it is possible to continue test measurements of the gas turbine engine 10, despite the failure of one or more sensors. The time available on test benches (e.g., on high-altitude test benches) for gas turbine engines is regularly restricted and the efficient load of a test bench can be improved by means of the sensor system 4, for example because it is not mandatory to replace a failed sensor.

In one example, the measured variable represents the temperature in the high pressure turbine 17. In particular, a volume flow rate (e.g., of an air flow or fuel flow), an air pressure upstream of the combustion chamber 163, an air pressure in the combustion chamber 163 and an air temperature downstream of the combustion chamber 163 are considered here as input variables.

In another example, the measured variable represents the actuating position (or alternatively, the movement derived therefrom) of an actuator, e.g., the valve 162. In particular, the volume flow rate of fuel in the fuel line 161, a pressure (e.g., in the combustion chamber 163) and a temperature (e.g., in the combustion chamber 163) are considered here as input variables.

Figure 4:
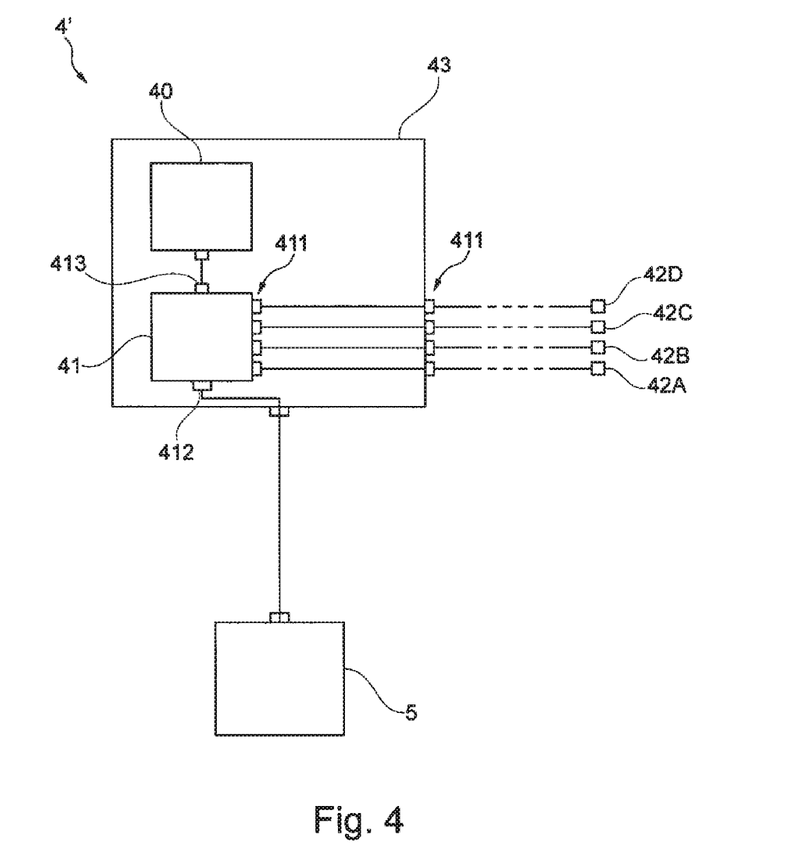
FIG. 4 shows a schematic view of a sensor system for the gas turbine engine.

FIG. 4 shows an alternative configuration of a sensor system 4' for the gas turbine engine 10 according to FIG. 1. In contrast to the sensor system 4 according to FIG. 3, provision is made of a single data processing device 43, which comprises both the correlation module 40 and the analysis module 41. The correlation module 40 and the analysis module 41 are embodied in the form of software modules, for example, which are connected or connectable to one another by way of a software interface. Otherwise, the functionality of the sensor system 4' corresponds to that of the sensor system 4 according to FIG. 3.

Optionally, the correlation module 40 and/or the analysis module 41 are integrated in an engine control unit (ECU).

Figure 5:
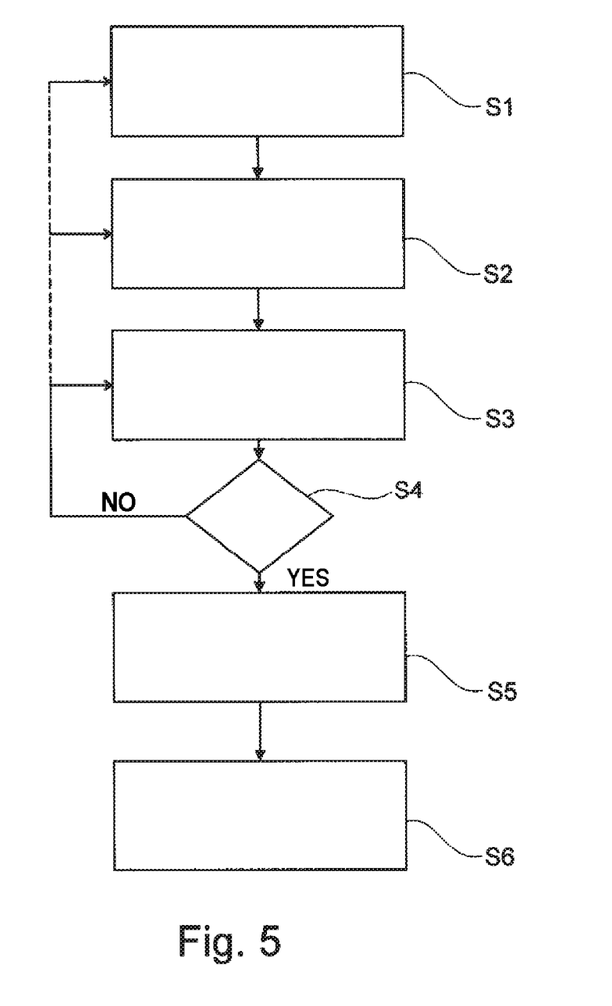
FIG. 5 shows a method for determining a measured variable.

FIG. 5 shows a method for determining a measured variable, in particular of the gas turbine engine 10. In the method, use can be made, in particular, of one of the above-described sensor systems 4, 4'.

A data record is provided in a first step S1. The data record comprises values of a plurality of input variables and values of the measured variable to be determined (later). In particular, the values of the measured variable in the data record are values measured by a hardware sensor; i.e., provision can be made for the measured variable to be measured by means of a hardware sensor and for the values obtained thus to be saved in the data record. In the case of a gas turbine engine, the data record can be ascertained within the scope of engine tests, for example; as an alternative or in addition thereto, said data record can be ascertained during running operation.

Correlations between the values of the input variables and the values of the measured variable are calculated in the second step S2. A subgroup of input variables of the plurality of input variables is selected on the basis of the calculated correlations. By way of example, a correlation matrix can be created to this end. All input variables that are significantly correlated to the measured variable can be selected into the subgroup. Alternatively, a predetermined number (e.g., between three and ten) or predetermined proportion of input variables with the strongest correlation can be selected as a subgroup.

A sensor model is created in a third step S3. The sensor model links the input variables of the subgroup of input variables to the measured variable. A self-learning algorithm, in particular, can be used in this case. By way of example, the self-learning algorithm is trained with the data record.

The quality of the sensor model is checked in an optional fourth step S4. To this end, a further data record can be provided (optionally, an overall data record is provided, which is subdivided into the data record and the further data record), said further data record comprising the values of a plurality of input variables and the values of the measured variable to be determined (later). Then, the values of the measured variable can be determined by means of the sensor model and on the basis of the values of the input variables of the further data record. These values can then be compared to the measured values of the measured variable present in the further data record. Should the quality be insufficient (for example, if a deviation exceeds a predetermined maximum value), there may be a return to one of steps S1 to S3. By way of example, another, e.g., more comprehensive, data record may be provided. To this end, it is possible, for example, to complement the data record with simulated values of input variables, in particular with simulated values representing extremal values. By way of example, if the method is used in the gas turbine engine 10, an extremal value may represent an overload case, e.g., overheating of the gas turbine engine 10. Further, an arrangement of the input variables in the data record may be modified. Averages, e.g., moving averages, can be formed, for example in order to suppress noise signals and thus calculate the correlations more precisely. The creation of the sensor model may be modified, too; e.g., the number of iterations and/or operators can be varied, for example if genetic programming is used.

A response time of the sensor model is an alternative or additional quality parameter to be checked in step S4. If the latter is too long, the sensor model can be simplified. Further, the stability of the sensor model can be alternatively or additionally checked, for example as to whether strong outliers occur.

If a sufficient quality (in general or for a specific application) has been determined in step S4, the method continues with a fifth step S5.

In the fifth step S5, (respectively) at least one further value of at least one of the input variables, in particular of a plurality of input variables, in particular from each of the subgroup of input variables, is acquired. To this end, the respectively assigned sensors are read.

At least one value of the measured variable is calculated in a sixth step S6 on the basis of the at least one further value of the at least one of the input variables (in particular, the values of the plurality of input variables) and the sensor model. This allows, for example, a defective sensor to be replaced and/or values of a sensor to be validated.

Further, it is possible not to measure one or more input variables by means of a sensor but likewise to determine these according to the above-described method, i.e., by means of an appropriate sensor model. Thus, virtual sensors can be provided in cascade-type fashion. At least one output variable of at least one virtual sensor can be used as an input variable of a further virtual sensor. The method can use a plurality of virtual sensors coupled (e.g. communicatively) to one another.

By way of example, steps S1 to S4 can be carried out once in advance such that the sensor model is obtained. By way of example, a first gas turbine engine, which is equipped with a sensor or a multiplicity of sensors for providing the measured values of the measured variable, said sensor(s) not being provided in a production version of the gas turbine engine, is used to this end. Then, steps S5 and S6 can be carried out at a later time, for example, on one or more other (in particular structurally equivalent) gas turbine engines, for example according to a production version.

The input variables may optionally also be monitored using the described method by comparing the determined measured variable with measured values of a sensor for the measured variable. Thus, a failure or defect can also be determined in the sensors of the input variables. In general, the method can be used to facilitate a redundant determination of the measured variable, to correct a faulty measurement position and/or to replace a defective sensor. As a result of this, interruptions for repairing a defective sensor system or repetitions due to a faulty sensor system can be avoided in tests (e.g., of the gas turbine engine 10). Further, it is possible to save sensors, facilitating a simpler design.

Optionally, one or more of the input variables are not measured by means of a sensor but simulated or calculated on the basis of a model.

The sensor system 4, 4' and the above-described method are particularly suitable, inter alia, for the applications in gas turbine engines set forth below.

Any input variables can be used in development tests that do not require real-time monitoring. Here, steps S5 and S6 can be implemented online or offline. Here, the quality and significance of the test measurements can be improved by determining the measured variable by means of the sensor model. By way of example, genetic programming and/or an artificial neural network can be used for the sensor model. Further, such tests, in particular, can be carried out with fewer sensors. This can improve the running behavior of the gas turbine engine.

Steps S5 and S6 are carried out online during development tests requiring real time monitoring. Here, determining the measured variable by means of the sensor model can replace, in particular, a defective sensor in order to prevent an interruption or delay of the tests.

Steps S5 and S6 are carried out online during applications requiring real time monitoring and certification. Here, all safety-relevant input variables are selected as input variables. The operational safety of the gas turbine engine can be improved by determining the measured variable by means of the sensor model. Here, rigorous modeling is used for the sensor model, in which the mathematical relationship between the input variables and the measured variable is known.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE SIGNS

4; 4' Sensor system
40 Correlation module
400 Memory device
41 Analysis module
410 Memory device
411 Input
412 Output
413 Input
42A-42J Sensor
43 Data processing device
5 Display device
9 Principal rotational axis
10 Gas turbine engine
11 Core engine
12 Air intake
14 Low pressure compressor
15 High pressure compressor
16 Combustion device
160 Fuel injection
161 Fuel line
162 Valve
163 Combustion chamber
17 High pressure turbine
18 Bypass thrust nozzle
19 Low pressure turbine
20 Core thrust nozzle
21 Nacelle
22 Bypass duct
23 Fan
26 Shaft
27 Interconnecting shaft
30 Gearbox
A Core airflow
B Bypass airflow

The invention claimed is:

1. A method for determining a present value based on previously obtained values of a measured variable of a gas turbine engine and/or a thermodynamic process, comprising the following steps:
   a) providing a data record comprising previously obtained values of a plurality of input variables and the previously obtained values of the measured variable;
   b) ascertaining correlations between the previously obtained values of the plurality of input variables and the previously obtained values of the measured variable;
   c) creating a sensor model based on the ascertained correlations;
   d) acquiring at least one further value of at least one of the plurality of input variables;
   e) determining the present value of the measured variable based on the at least one further value and the sensor model;
   using the present value of the measured variable obtained in steps a)-e) to supplement the data record; and
   providing that the sensor model comprises a correlation matrix and/or is ascertained with aid of a correlation matrix.

2. The method according to claim 1, wherein the previously obtained values of the measured variable provided in step a) are, or have been, provided by a sensor that measured the measured variable.

3. The method according to claim 1, wherein a subgroup of input variables of the plurality of input variables is selected in step c) and used to create the sensor model.

4. The method according to claim 1, wherein the sensor model is ascertained by a self-learning algorithm.

5. The method according to claim 1, wherein the plurality of input variables and the measured variable are variables of a gas turbine engine.

6. The method according to claim 1, wherein at least one of the plurality of input variables specifies a pressure, a temperature and/or a volume flow rate.

7. The method according to claim 1, wherein the previously obtained values of the plurality of input variables provided in step a) comprise values measured by at least one sensor and/or simulated values.

8. The method according to claim 1, wherein the measured variable specifies a pressure, a temperature, a volume flow rate or a manipulated variable of an adjustable component.

9. The method according to claim 8, wherein the adjustable component is a valve.

10. A sensor system for determining a present value based on previously obtained values of a measured variable of a gas turbine engine and/or a thermodynamic process, comprising, the sensor system comprising:
    a correlation module embodied to obtain a data record comprising previously obtained values of a plurality of input variables and the previously obtained values of the measured variable, ascertain correlations between the previously obtained values of the plurality of input variables and the previously obtained values of the measured variable, and ascertain at least one sensor model on the basis of the ascertained correlations; and
    an analysis module configured to receive the at least one sensor model from the correlation module, wherein the analysis module has at least one input and one output and is embodied, upon provision of at least one further value of at least one of the plurality of input variables, to determine the present value of the measured variable on the basis of the at least one further value of at least one of the plurality of input variables and the at least one sensor model and to output the present value at the output, wherein the present value of the measured variable determined by the analysis module is used to supplement the previously obtained values of the plurality of input variables and/or the previously obtained values of the measured variable.

11. The sensor system according to claim 10, wherein the correlation module comprises a memory device, on which the data record is stored.

12. The sensor system according to claim 10, further comprising at least one sensor embodied and configured to measure values of at least one of the input variables and provide the values to the at least one input of the analysis module.

13. The sensor system according to claim 12, wherein the at least one sensor is a pressure sensor, a temperature probe or a volume flow rate measuring device.

14. A gas turbine engine according to claim 10, and further comprising virtual sensors, wherein an output of one of the virtual sensors is connected to an input of a further one of the virtual sensors.

15. The gas turbine engine according to claim 14, wherein the gas turbine engine is an aircraft gas turbine engine.

* * * * *